United States Patent
Wu et al.

(10) Patent No.: US 10,365,597 B2
(45) Date of Patent: Jul. 30, 2019

(54) ENDLESS BELT COMPRISING BORON NITRIDE NANOTUBES

(71) Applicant: XEROX CORPORATION, Norwalk, CT (US)

(72) Inventors: Jin Wu, Pittsford, NY (US); Lin Ma, Pittsford, NY (US)

(73) Assignee: XEROX CORPORATION, Norwalk, CT (US)

( * ) Notice: Subject to any disclaimer, the term of this patent is extended or adjusted under 35 U.S.C. 154(b) by 308 days.

(21) Appl. No.: 15/166,083

(22) Filed: May 26, 2016

(65) Prior Publication Data

US 2017/0343936 A1 Nov. 30, 2017

(51) Int. Cl.

| | | |
|---|---|---|
| G03G 15/20 | (2006.01) | |
| B82B 1/00 | (2006.01) | |
| G03G 15/16 | (2006.01) | |
| B32B 5/16 | (2006.01) | |
| C01B 21/064 | (2006.01) | |
| B32B 27/28 | (2006.01) | |

(52) U.S. Cl.
CPC ....... *G03G 15/2057* (2013.01); *G03G 15/162* (2013.01); *G03G 15/1685* (2013.01); *B32B 5/16* (2013.01); *B32B 27/281* (2013.01); *B32B 2264/10* (2013.01); *B32B 2413/00* (2013.01); *B82B 1/008* (2013.01); *C01B 21/064* (2013.01); *Y10T 428/24802* (2015.01); *Y10T 428/25* (2015.01); *Y10T 428/2916* (2015.01); *Y10T 428/31721* (2015.04)

(58) Field of Classification Search
CPC ............ B32B 2264/10; B32B 2413/00; B32B 2433/00; B32B 27/281; B32B 5/16; B82B 1/008; C01B 21/064; G03G 15/162; G03G 15/1685; G03G 15/2057; Y10T 428/24802; Y10T 428/25; Y10T 428/2916; Y10T 428/31721
See application file for complete search history.

(56) References Cited

U.S. PATENT DOCUMENTS

| | | | |
|---|---|---|---|
| 8,206,674 B2 | 6/2012 | Smith et al. | |
| 2006/0292360 A1 | 12/2006 | Hays et al. | |
| 2009/0124705 A1* | 5/2009 | Meyer | A61K 33/44 514/769 |
| 2010/0055365 A1* | 3/2010 | Nakajima | B29C 41/085 428/36.9 |
| 2012/0052306 A1* | 3/2012 | Wu | G03G 15/2053 428/421 |
| 2015/0086798 A1 | 3/2015 | Wu et al. | |
| 2015/0153687 A1 | 6/2015 | Wu et al. | |

FOREIGN PATENT DOCUMENTS

WO WO-2008123326 A1 * 10/2008 ............ B82Y 30/00

OTHER PUBLICATIONS

Machine translation of WO 2008123326. (Year: 2008).*

(Continued)

*Primary Examiner* — John D Freeman
(74) *Attorney, Agent, or Firm* — MH2 TECHNOLOGY LAW GROUP LLP

(57) ABSTRACT

An endless belt comprising a polyimide-based substrate layer. A plurality of boron nitride nanotubes are dispersed in the polyimide.

15 Claims, 3 Drawing Sheets

(56) References Cited

OTHER PUBLICATIONS

TEKMAT Advanced Materials, "BNNT-R Boron Nitride Nanotubes," Information sheet, 1 pages, date unknown.
BNNT, LLC, "Boron Nitride Nanotubes" technical data/specifications sheet, 4 pages, date unknown.
Griffiths, "ASI Adhesives & Sealants—Adhesion Promotion on Inorganic and Organic Substrates," Jan. 1, 2010, 4 pages.
Kenrich Petrochemicals, "Aluminates," 3 pages, date unknown.
BNNT, LLC, "Boron Nitride Nanotubes," 2014, 4 pages.
Wikipedia, "Dopant," https://en.wikipedia.org/wiki/Dopant, downloaded Jun. 25, 2018, 3 pages.
Wikipedia, "Boron Nitride," https://en.wikipedia.org/wiki/Boron_nitride, downloaded Jun. 25, 2018, 16 pages.
Wikipedia, "Carbon Nanotube," https://en.wikipedia.org/wiki/Carbon_nanotube, downloaded Jun. 5, 2018, 23 pages.

* cited by examiner

ENDLESS BELT COMPRISING BORON NITRIDE NANOTUBES

DETAILED DESCRIPTION

Field of the Disclosure

This disclosure is generally directed to an endless belt useful in electrophotographic imaging and other printing apparatuses.

Background

In the electrophotographic printing process, a toner image can be fixed or fused upon a support (e.g., a paper sheet) using a fuser member. Fuser members often include polymer (e.g., polyimide) substrates, referred to as belts, as a support layer. These polyimide fuser belts can have rigid requirements with respect to such things as modulus of elasticity, durability, onset decomposition temperature and so forth. Further, the polymeric materials from which the fuser belts are made typically have a low thermal conductivity near room temperature.

Current efforts in polyimide development are aimed at improving the physical properties and thermal conductivity of belt substrates. For example, metal and ceramic fillers have been incorporated into polymeric materials to enhance conductivity of fuser members. However, incorporation of metal and ceramic fillers into polymeric material can undesirably decrease the Young's modulus of polymeric material.

Boron nitride (BN) powder is known to improve thermal conductivity for polymeric materials generally, including polyimide. However, the crystal structure of boron nitride leads to inherent anisotropy in the material and hence several physical properties, such as thermal conductivity, coefficient of expansion, refractive index, etc., are different in the a-b plane versus the c-direction. This anisotropy is most notable in thermal conductivity where the in-plane thermal conductivity (i.e. in the a-b plane) is estimated to be as high ~300 W/mK, while the through-plane (in the c-direction) thermal conductivity is less than 10 W/mK. Due in part to the anisotropic character of BN, the effects of incorporation of the BN powder into polyimide to improve thermal conductivity have not been as significant as anticipated. For example, while BN powder is known to have increased thermal conductivity in polyimide, it does so with very high concentration (e.g., above 20%) due to its inefficiency from anisotropic conduction.

It would be desirable to have a fuser belt having higher thermal conductivity, high thermal diffusivity and/or a high Young's modulus. Finding novel materials that can meet rigid belt specifications while at the same time reducing cost of manufacturing is a desirable objective.

SUMMARY

An embodiment of the present disclosure is directed to an endless belt. The endless belt comprises a substrate layer comprising polyimide. A plurality of boron nitride nanotubes are dispersed in the polyimide.

Another embodiment of the present disclosure is directed to an endless belt. The endless belt comprises a substrate layer comprising polyimide and a plurality of boron nitride nanotubes dispersed in the polyimide. An intermediate layer is disposed on the substrate layer. The intermediate layer comprises a material selected from the group consisting of silicones, fluorosilicones and fluoroelastomers. A release layer is disposed on the intermediate layer, the release layer comprising a fluoropolymer.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrates embodiments of the present teachings and together with the description, serve to explain the principles of the present teachings.

Figure 1:
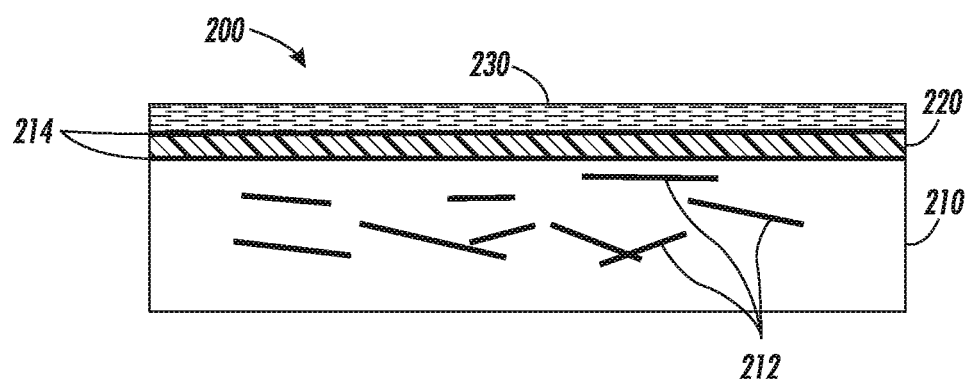
FIG. 1 depicts a schematic, cross-sectional view of an endless belt, accordance to an embodiment of the present teachings.

It should be noted that some details of the figure have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. In the drawings, like reference numerals have been used throughout to designate identical elements. In the following description, reference is made to the accompanying drawing that forms a part thereof, and in which is shown by way of illustration a specific exemplary embodiment in which the present teachings may be practiced. The following description is, therefore, merely exemplary.

An embodiment of the present disclosure is directed to an endless belt. The endless belt comprises a substrate layer comprising polyimide. A plurality of boron nitride nanotubes are dispersed in the polyimide.

In various embodiments, the endless belt can include, for example, a substrate, with one or more functional intermediate and/or surface layers formed thereon. The substrate can be formed using suitable materials that are non-conductive or conductive depending on a specific configuration, for example, as shown in FIG. 1.

FIG. 1 shows an embodiment of a cross-section of an endless belt that can be employed as a fusing member 200. The endless belt can include a substrate layer 210 comprising polyimide and a plurality of boron nitride nanotubes 212. In addition, the endless belt can optionally include one or more functional intermediate layers 220 and an outer surface layer 230 formed thereon. The outer surface layer 230 is also referred to as a release layer. The belt substrate 210 is described in greater detail below.

Functional Intermediate Layer

Examples of materials used for the functional intermediate layer 220 (also referred to as cushioning layer or intermediate layer) include silicones, fluorosilicones and fluoroelastomers. Silicones can include silicone rubbers such as room temperature vulcanization (RTV) silicone rubbers, high temperature vulcanization (HTV) silicone rubbers, and low temperature vulcanization (LTV) silicone rubbers. These rubbers are known and readily available commercially, such as SILASTIC® 735 black RTV and SILASTIC® 732 RTV, both from Dow Corning; 106 RTV Silicone Rubber and 90 RTV Silicone Rubber, both from General Electric; and JCR6115CLEAR HTV and SE4705U HTV silicone rubbers from Dow Corning Toray Silicones. Other suitable silicone and fluorosilicone materials include siloxanes (such as polydimethylsiloxanes); fluorosilicones such as Silicone Rubber 552, available from Sampson Coatings, Richmond, Va.; liquid silicone rubbers such as vinyl cross-linked heat curable rubbers or silanol room temperature cross-linked materials; and the like. Another specific example is Dow Corning SYLGARD 182. Commercially available LSR rubbers include Dow Corning Q3-6395, Q3-6396, SILASTIC® 590 LSR, SILASTIC® 591 LSR, SILASTIC® 595 LSR, SILASTIC® 596 LSR, and SILASTIC® 598 LSR from Dow Corning. The functional layers provide elasticity and can be mixed with inorganic particles, for example SiC or $Al_2O_3$, as desired.

Other materials suitable for use as functional intermediate layer 220 also include fluoroelastomers. Example fluoroelastomers are from the class of 1) copolymers of two of vinylidenefluoride, hexafluoropropylene, and tetrafluoroethylene; 2) terpolymers of vinylidenefluoride, hexafluoropropylene, and tetrafluoroethylene; and 3) tetrapolymers of vinylidenefluoride, hexafluoropropylene, tetrafluoroethylene, and a cure site monomer. These fluoroelastomers are known commercially under various designations such as VITON A®, VITON B®, VITON E®, VITON E 60C®, VITON E430®, VITON 910®, VITON GH®; VITON GF®; and VITON ETP®. The VITON® designation is a trademark of E.I. DuPont de Nemours, Inc.

The cure site monomer can be 4-bromoperfluorobutene-1; 1,1-dihydro-4-bromoperfluorobutene-1; 3-bromoperfluoropropene-1; 1,1-dihydro-3-bromoperfluoropropene-1, or any other suitable, known cure site monomer, such as those commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a registered trademark of 3M Company. Additional commercially available materials include AFLAStm a poly(propylene-tetrafluoroethylene), and FLUOREL II® (LII900) a poly(propylene-tetrafluoroethylenevinylidenefluoride), both also available from 3M Company, as well as the Tecnoflons identified as FOR-60KIR®, FOR-LHF®, NM® FOR-THF®, FOR-TFS®, TH®, NH®, P757®, TNS®, T439®, PL958®, BR9151® and TN505®, available from Ausimont.

The fluoroelastomers VITON GH® and VITON GF® have relatively low amounts of vinylidenefluoride. For example, the VITON GF® and VITON GH® have about 35 weight percent of vinylidenefluoride, about 34 weight percent of hexafluoropropylene, and about 29 weight percent of tetrafluoroethylene, with about 2 weight percent cure site monomer.

The thickness of the functional intermediate layer 220 is from about 30 microns to about 1,000 microns, or from about 100 microns to about 800 microns, or from about 150 microns to about 500 microns.

Release Layer

An exemplary embodiment of a release layer 230 includes fluoropolymer materials. Fluoropolymer materials suitable for use in the formulation described herein include fluorine-containing polymers. These polymers include fluoropolymers comprising a monomeric repeat unit that is selected from the group consisting of vinylidene fluoride, hexafluoropropylene, tetrafluoroethylene, perfluoroalkylvinylether, and mixtures thereof. The fluoropolymers may include linear or branched polymers, and cross-linked fluoroelastomers. Examples of fluoropolymer include polytetrafluoroethylene (PTFE); perfluoroalkoxy polymer resin (PFA); copolymers of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), and hexafluoropropylene (HFP), and mixtures thereof. The fluoropolymer materials provide chemical and thermal stability and have a low surface energy. The fluoropolymer materials have a melting temperature of from about 255° C. to about 360° C. or from about 280° C. to about 330° C. These particles are melted to form the release layer.

For the fuser member 200, the thickness of the outer surface layer or release layer 230 can be from about 10 microns to about 100 microns, or from about 20 microns to about 80 microns, or from about 40 microns to about 60 microns.

Adhesive Layer(s)

Optionally, any known and available suitable adhesive layer(s) 214, also referred to as a primer layer, may be positioned between the release layer 230, the functional intermediate layer 220 and the substrate 210. Examples of suitable, well known adhesives include silanes such as amino silanes (such as, for example, HV Primer 10 from Dow Corning), titanates, zirconates, aluminates, and the like, and mixtures thereof. In an embodiment, an adhesive in from about 0.001 percent to about 10 percent solution can be wiped on the substrate. The adhesive layer can be coated on the substrate, or on the outer layer, to a thickness of from about 2 nanometers to about 2,000 nanometers, or from about 2 nanometers to about 500 nanometers. The adhesive can be coated by any suitable known technique, including spray coating or wiping.

Figure 2A:
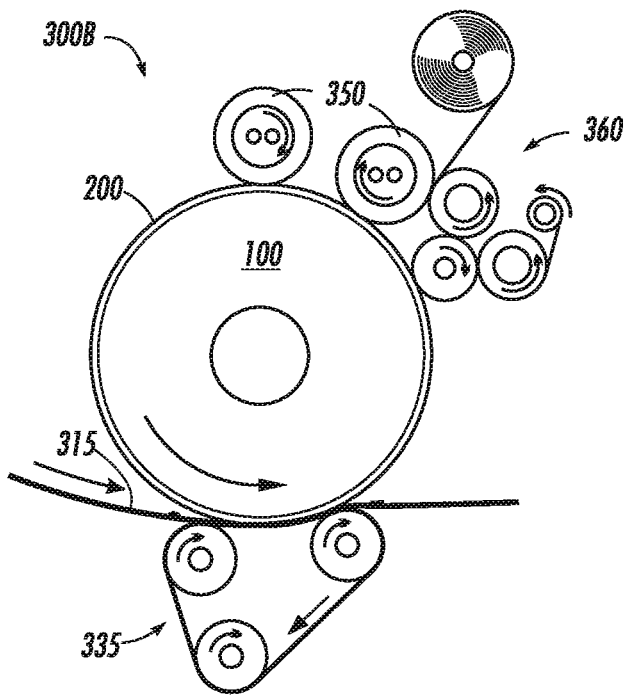
FIG. 2A depicts an exemplary fusing configuration using the fuser member shown in FIG. 1, in accordance with the present teachings.
Figure 2B:
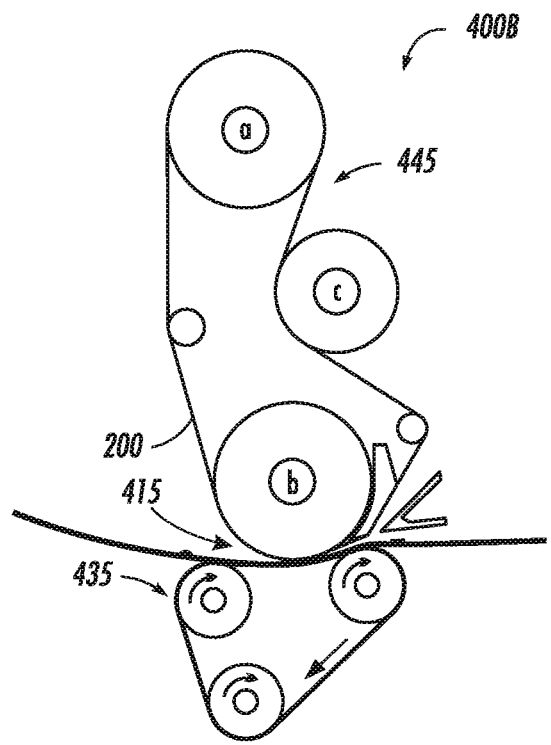
FIG. 2B depicts an exemplary fusing configuration using the fuser member shown in FIG. 1, in accordance with the present teachings.

FIGS. 2A and 2B depict exemplary fusing configurations for the fusing process in accordance with the present teachings. It should be readily apparent to one of ordinary skill in the art that the fusing configurations 300B and 400B depicted in FIGS. 2A-2B, respectively, represent generalized schematic illustrations and that other members/layers/substrates/configurations can be added or existing members/layers/substrates/configurations can be removed or modified. Although an electrophotographic printer is described herein, the disclosed apparatus and method can be applied to other printing technologies. Examples include offset printing and inkjet and solid transfix machines.

FIG. 2A depicts the fusing configuration 300B using a fuser belt 200, as shown in FIG. 1, in accordance with an embodiment of the present teachings. The configuration 300B can include a fuser belt 200 that forms a fuser nip with a pressure applying mechanism 335, such as a pressure belt, for an image supporting material 315. In various embodiments, the pressure applying mechanism 335 can be used in combination with a heat lamp (not shown) to provide both the pressure and heat for the fusing process of the toner particles on the image supporting material 315. In addition, the configuration 300B can include one or more external heat rolls 350 along with, e.g., a cleaning web 360, as shown in FIG. 2A.

FIG. 2B depicts the fusing configuration 400B using a fuser belt 200, as shown in FIG. 1, in accordance with an embodiment of the present teachings. The configuration 400 can include a fuser belt 200 that forms a fuser nip with a pressure applying mechanism 435, such as a pressure belt in FIG. 2B, for a media substrate 415. In various embodiments, the pressure applying mechanism 435 can be used in a combination with a heat lamp to provide both the pressure and heat for the fusing process of the toner particles on the media substrate 415. In addition, the configuration 400 can include a mechanical system 445 to move the fuser belt 200 and thus fusing the toner particles and forming images on the media substrate 415. The mechanical system 445 can include one or more rolls 445a-c, which can also be used as heat rolls when needed.

Figure 3:
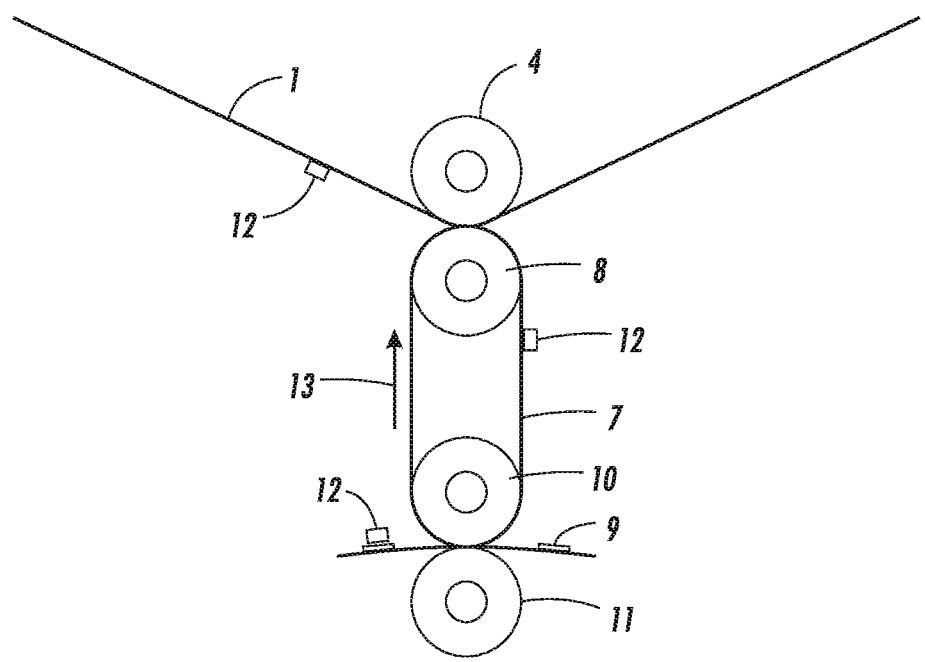
FIG. 3 depicts a fuser configuration using a transfix apparatus.

FIG. 3 demonstrates a view of an embodiment of a transfix member 7, which may be in the form of a belt, sheet, film, or like form. The transfix member 7 is constructed similarly to the fuser belt 200 described above. The developed image 12 positioned on intermediate transfer member 1, is brought into contact with and transferred to transfix member 7 via rollers 4 and 8. Roller 4 and/or roller 8 may or may not have heat associated therewith. Transfix member 7 proceeds in the direction of arrow 13. The developed image is transferred and fused to a copy substrate 9 as copy substrate 9 is advanced between rollers 10 and 11. Rollers 10 and/or 11 may or may not have heat associated therewith.

Figure 4:
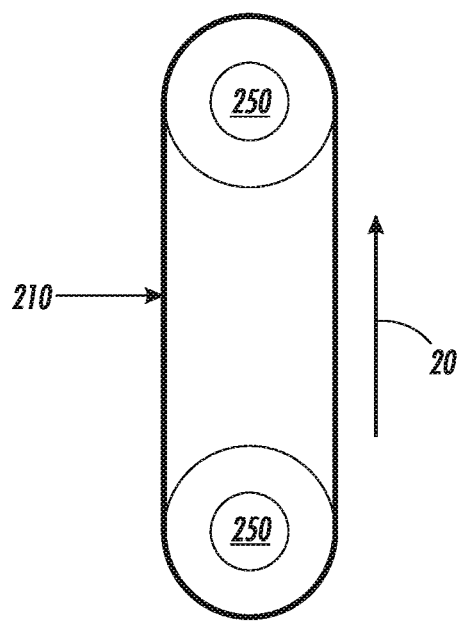
FIG. 4 depicts a tensioning of a fusing member for final curing.

FIG. 4 demonstrates a view of an embodiment of a fusing member including substrate 210 wherein the member proceeds in the direction of arrow 20 around rollers 250.

Substrate Layer

An embodiment of the present disclosure is directed to a polyimide composition suitable for use as a substrate layer 210 of FIG. 1. The polyimide composition includes a plurality of boron nitride nanotubes (BNNTs) 212 dispersed therein. One or more benefits of the boron nitride nanotubes may be realized, such as increased thermal diffusivity, increased thermal conductivity and increased Young's modulus, compared to the same substrate without the BNNTs.

Boron nitride nanotubes are strong, chemically resistant and have relatively high thermal conductivity. For instance, boron nitride can be many times stronger than steel (e.g., such as 100 times stronger) and can be stable up to relatively high temperatures, such as about 900° C. Further, BNNTs exhibit relatively isotropic thermal conduction, especially when compared to crystalline boron nitride, which as discussed above, exhibits anisotropic thermal conductivity.

Any suitable boron nitride nanotubes can be employed in the substrate. For example, the BNNTs can be single walled or multi-walled, such as 2 to 20 walls, or 2 to 10 walls, or 2 to 5 walls. The BNNTs can be single tubes or bundled in groups. The BNNTs can be made by any suitable methods, such as high temperature/high pressure (HTP) methods or plasma methods. One example of a known method is described in detail in U.S. Pat. No. 8,206,674, the disclosure of which patent is incorporated herein by reference in its entirety.

The boron nitride nanotubes can have any average diameter, such as an average diameter of from about 1 nanometer to about 100 nanometers, or from about 2 nm to about 10 nm. The boron nitride nanotubes can have an average length of from about 0.1 microns to about 1000 microns, such as about 1 micron to about 500 microns, or about 10 microns to about 400 microns, or about 100 microns to about 300 microns, where the length is determined by SEM measurement. The boron nitride nanotubes can have any suitable aspect ratio. Examples include aspect ratios of 100 or more, such as aspect ratios ranging from about 200 to about 50,000 or more, such as about 1000 to about 20,000, or about 1500 to about 10,000.

The boron nitride nanotubes can have any suitable surface area. Examples can include a surface area of more than 50 $m^2/g$, such as about 50 $m^2/g$ to about 1000 $m^2/g$, or about 100 $m^2/g$ to about 500 $m^2/g$, or about 100 $m^2/g$ to about 300 $m^2/g$, as determined by Brunauer—Emmett—Teller (BET) analysis.

Commercially available examples of BNNT material include BNNT P1 Beta made by BNNT, LLC of Newport News, Va.; and TEKMAT™ BNNT-R available from Tekna Advanced Materials of Sherbrooke, QC, Canada.

Any suitable amount of the BNNTs can be employed in the substrate layer. As an example, the amount of BNNTs can range from about 0.01 weight percent to about 20 weight percent, based on the total weight of the substrate layer, such as from about 0.1 to about 15 weight percent of the substrate, or from about 1 weight percent to about 10 weight percent of the substrate. In an embodiment, the amount of BNNTs is less than 20 weight percent, based on the total weight of the substrate layer.

The disclosed polyimide of the substrate layer 210 can be formed by employing a polyamic acid approach that involves mixing at least one dianhydride and at least one diamine, as is well known in the art. The dianhydride and diamine can react in a suitable solvent to yield a corresponding polyamic acid. The polyamic acid can be cyclized to form the polyimide.

Suitable dianhydrides include aromatic dianhydrides and aromatic tetracarboxylic acid dianhydrides such as, for example, 9,9-bis(trifluoromethyl)xanthene-2,3,6,7-tetracarboxylic acid dianhydride, 2,2-bis(3,4-dicarboxyphenyl) hexafluoropropane dianhydride, 2,2-bis((3,4-dicarboxyphenoxy) phenyl)hexafluoropropane dianhydride, 4,4'-bis(3,4-dicarboxy-2,5,6-trifluorophenoxy)octafluorobiphenyl dianhydride, 3,3',4,4'-tetracarboxybiphenyl dianhydride, 3,3',4,4'-tetracarboxybenzophenone dianhydride, di-(4-(3,4-dicarboxyphenoxy)phenyl)ether dianhydride, di-(4-(3,4-dicarboxyphenoxy)phenyl) sulfide dianhydride, di-(3,4-dicarboxyphenyl)methane dianhydride, di-(3,4-dicarboxyphenyl) ether dianhydride, 1,2,4,5-tetracarboxybenzene dianhydride, 1,2,4-tricarboxybenzene dianhydride, butanetetracarboxylic dianhydride, cyclopentanetetracarboxylic dianhydride, pyromellitic dianhydride, 1,2,3,4-benzenetetracarboxylic dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 3,4,9,10-perylenetetracarboxylic dianhydride, 2,3,6,7-anthracene tetracarboxylic dianhydride, 1,2,7,8-phenanthrenetetracarboxylic dianhydride, 3,3',4,4'-biphenyltetracarboxylic dianhydride, 2,2',3,3'-biphenyltetracarboxylic dianhydride, 3,3',4-4'-benzophenonetetracarboxylic dianhydride, 2,2',3,3'-benzophenonetetracarboxylic dianhydride, 2,2-bis(3,4-dicarboxyphenyl)propane dianhydride, 2,2-bis(2,3-dicarboxyphenyl)propane dianhydride, bis(3,4-dicarboxyphenyl)ether dianhydride, bis(2,3-dicarboxyphenyl) ether dianhydride, bis(3,4-dicarboxyphenyl)sulfone dianhydride, bis(2,3-dicarboxyphenyl)sulfone 2,2-bis(3,4-dicarboxyphenyl)-1,1,1,3,3,3-hexafluoropropane dianhydride, 2,2-bis(3,4-dicarboxyphenyl)-1,1,1,3,3,3-hexachloropropane dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)methane dianhydride, 4,4'-(p-phenylenedioxy) diphthalic dianhydride, 4,4'-(m- phenylenedioxy)diphthalic dianhydride, 4,4'-diphenylsulfidedioxybis(4-phthalic acid)dianhydride, 4,4'-diphenylsulfonedioxybis(4-phthalic acid)dianhydride, methylenebis(4-phenyleneoxy-4-phthalic acid)dianhydride, ethylidenebis(4-phenyleneoxy-4-phthalic acid)dianhydride, isopropylidenebis-(4-phenyleneoxy-4-phthalic acid)dianhydride, hexafluoroisopropylidenebis(4-phenyleneoxy-4-phthalic acid)dianhydride, and the like.

Exemplary diamines suitable for use in the preparation of the polyamic acid include 4,4'-bis-(m-aminophenoxy)-biphenyl, 4,4'-bis-(m-aminophenoxy)-diphenyl sulfide, 4,4'-bis-(m-aminophenoxy)-diphenyl sulfone, 4,4'-bis-(p-aminophenoxy)-benzophenone, 4,4'-bis-(p-aminophenoxy)-diphenyl sulfide, 4,4'-bis-(p-aminophenoxy)-diphenyl sulfone, 4,4'-diamino-azobenzene, 4,4'-diaminobiphenyl, 4,4'-diam inodiphenylsulfone, 4,4'-diamino-p-terphenyl, 1,3-bis-(gamma-aminopropyl)-tetramethyl-disiloxane, 1,6-diaminohexane, 4,4'-diam inodiphenylmethane, 3,3'-diaminodiphenylmethane, 1,3-diaminobenzene, 4,4'-diam ino-diphenyl ether, 2,4'-diaminodiphenylether, 3,3'-diaminodiphenylether, 3,4'-diam inodiphenylether, 1,4-diaminobenzene, 4,4'-diamino-2,2',3,3',5,5',6,6'-octafluorbiphenyl, 4,4'-diamino-2,2',3,3',5,5',6,6'-octafluorodiphenyl ether, bis[4-(3-aminophenoxy)-phenyl] sulfide, bis[4-(3-aminophenoxy)phenyl] sulfone, bis[4-(3-am inophenoxy)phenyl] ketone, 4,4'-bis(3-aminophenoxy)biphenyl, 2,2-bis[4-(3-am inophenoxy)phenyl]-propane, 2,2-bis[4-(3-aminophenoxy)phenyl]-1,1,1,3,3,3-hexafluoropropane, 4,4'-diaminodiphenyl sulfide, 4,4'-diaminodiphenyl ether, 4,4'-diam inodiphenyl sulfone, 4,4'-diaminodiphenylmethane, 1,1-di(p-aminophenyl)ethane, 2,2-di(p-aminophenyl)propane, and 2,2-di(p-aminophenyl)-1,1,1,3,3,3-hexafluoropropane, and the like and mixtures thereof.

The dianhydrides and diamines are, for example, selected in a weight ratio of from about 20:80 to about 80:20, and more specifically, in an about 50:50 weight ratio. The above aromatic dianhydrides, such as aromatic tetracarboxylic acid dianhydrides, and diamines, such as aromatic diamines, can be used singly or as a mixture.

Examples of well known polyimide precursor dianhydride/diamine mixtures include pyromellitic dianhydride/4,4'-oxydianiline, pyromellitic dianhydride/phenylenediamine, biphenyl tetracarboxylic dianhydride/4,4'-oxydianiline, biphenyl tetracarboxylic dianhydride/phenylenediamine, benzophenone tetracarboxylic dianhydride/4,4'-oxydianiline, benzophenone tetracarboxylic dianhydride/4,4'-oxydianiline/phenylenediamine, and the like and mixtures thereof.

Commercial examples of polyimide precursors include polyamic acids of pyromellitic dianhydride/4,4-oxydianiline, such as PYRE-ML RC5019 (about 15-16 weight percent in N-methyl-2-pyrrolidone, NMP), RC5057 (about 14.5-15.5 weight percent in NMP/aromatic hydrocarbon=80/20), and RC5083 (about 18-19 weight percent in NMP/DMAc=15/85), all from Industrial Summit Technology Corp., Parlin, N.J.; and DURIMIDE® 100, commercially available from FUJIFILM Electronic Materials U.S.A., Inc.

Commercial examples of polyimide precursors also include polyamic acids of biphenyl tetracarboxylic dianhydride/p-benzenedianiline known as U-VARNISH A and U-VARNISH S (about 20 weight in NMP), both from UBE America Inc., New York, N.Y.

Commercial examples of polyimide precursors of biphenyl tetracarboxylic dianhydride/phenylenediamine include PI-2610 (about 10.5 weight in NMP), and PI-2611 (about 13.5 weight in NMP), both from HD MicroSystems, Parlin, N.J.; and BPDA resin (about 16.5 weight in NMP) from Kaneka Corp.

Commercial examples of polyimide precursors of benzophenone tetracarboxylic dianhydride/4,4'-oxydianiline include RP46, and RP50 (about 18 weight percent in NMP), both from Unitech Corp., Hampton, Va.

Commercial examples of polyimide precursors of benzophenone tetracarboxylic dianhydride/4,4'-oxydianiline/phenylenediamine include PI-2525 (about 25 weight percent in NMP), PI-2574 (about 25 weight percent in NMP), PI-2555 (about 19 weight percent in NMP/aromatic hydrocarbon=80/20), and PI-2556 (about 15 weight percent in NMP/aromatic hydrocarbon/propylene glycol methyl ether=70/15/15), all from HD MicroSystems, Parlin, N.J.

Various amounts of polyimide precursors can be selected for the substrate, such as for example, from about 80 to about 99.99 weight percent, from about 90 to about 99.8 weight percent, or from about 95 to about 99 weight percent, based on the total weight of the substrate.

The polymers employed in the polyimide-based substrate can comprise any suitable polyimide repeating units. Examples of suitable polyimide repeating units are represented by the structures in the parenthesis below:

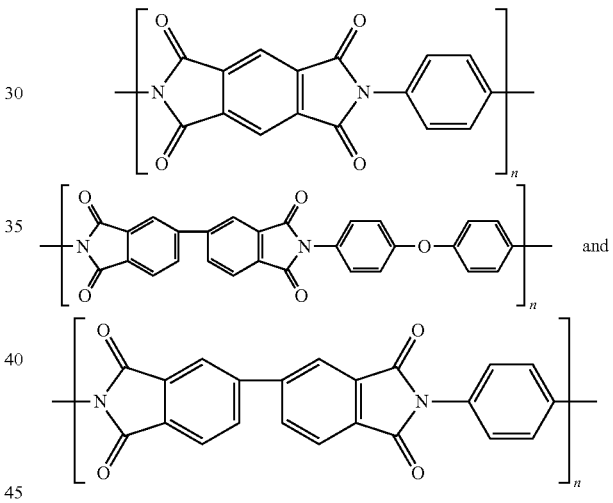

wherein n represents that a variable number of the repeating groups can be employed. In an embodiment, n can be greater than 50 or 100, such as greater than 500, 1000 or greater than 10,000 units, depending on the degree of polymerization. One of ordinary skill in the art would readily be able to determine a desired degree of polymerization for the polyimide material in the substrate.

The polyimide substrate composition can optionally comprise a polysiloxane copolymer to enhance or smooth the coating. The concentration of the polysiloxane copolymer is less than about 1 weight percent or less than about 0.2 weight percent, based on the total weight of the substrate. The optional polysiloxane copolymer includes a polyester modified polydimethylsiloxane, commercially available from BYK Chemical with the trade name of BYK® 310 (about 25 weight percent in xylene) and 370 (about 25 weight percent in xylene/alkylbenzenes/cyclohexanone/monophenylglycol=75/11/7/7); a polyether modified polydimethylsiloxane, commercially available from BYK Chemical with the trade name of BYK® 330 (about 51 weight percent in methoxypropylacetate) and 344 (about 52.3 weight percent in xylene/isobutanol=80/20), BYK®-SILCLEAN 3710 and 3720 (about 25 weight percent in methoxypropanol); a polyacrylate modified polydimethylsiloxane, commercially available from BYK Chemical with the trade name of BYK®-SILCLEAN 3700 (about 25 weight percent in methoxypropylacetate); or a polyester polyether modified polydimethylsiloxane, commercially available from BYK Chemical with the trade name of BYK® 375 (about 25 weight percent in Di-propylene glycol monomethyl ether).

Conductive or non-conductive fillers may optionally be present in the polyimide substrate layer and/or any of the other layers, including the intermediate layer, surface layer or adhesive layers. Example fillers include carbon blacks, aluminum nitride, boron nitride, aluminum oxide, graphite, graphene, copper flakes, nano diamond, carbon nanotubes, metal oxides, doped metal oxides, metal flakes, and mixtures thereof. In various embodiments, other additives known to one of ordinary skill in the art can also be included to form the disclosed composite materials.

In an embodiment, the disclosed polyimide substrate layer 210 possesses a Young's modulus of from about 4,000 MPa to about 10,000 MPa, or from about 5,000 MPa to about 10,000 MPa, or from about 6,000 MPA to about 10,000 MPa; and an onset decomposition temperature of from about 400° C. to about 600° C., or from about 425° C. to about 575° C., or from about 450° C. to about 550° C.

The polyimide substrate layer can be made by any suitable method. A variety of suitable techniques for making such substrate layers are well known in the art. An example of a suitable technique for making the substrate layer is disclosed in U.S. Patent Publication 2015/0086798, filed on Sep. 20, 2013, as application Ser. No. 14/032,446, the disclosure of which is herein incorporated by reference in its entirety.

Specific examples will now be described in detail. These examples are intended to be illustrative, and not limited to the materials, conditions, or process parameters set forth in these embodiments. All parts are percentages by solid weight unless otherwise indicated.

EXAMPLES

Prophetic Example 1

A polyamic acid of biphenyl tetracarboxylic dianhydride/p-benzenedianiline (BPDA resin from Kaneka, about 16.6 wt % in NMP) is mixed with BNNT P1 Beta fiber (from BNNT, LLC) and additional NMP solvent with a high shear mixer at the weight ratio of the solid components of 99/1. After coating and subsequent curing, a BNNT/polyimide composite belt is obtained for fuser belt application. Although not reduced into practice yet due to the high cost of the BNNT material, it is believed that one or both of the thermal conductivity and mechanical integrity of the polyimide fuser belt will be significantly improved.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompases by the following claims.

What is claimed is:

1. An endless belt comprising:
   a substrate layer comprising polyimide made from precursors comprising at least one dianhydride and at least one diamine; and a plurality of boron nitride nanotubes dispersed in the polyimide, the boron nitride nanotubes having a surface area of from about 50 m²/g to about 500 m²/g as determined by BET analysis, and being in an amount ranging from about 0.01 wt. % to about 20 wt. %, based on the total weight of the substrate layer, the substrate layer having a Young's modulus of from about 4,000 MPa to about 10,000 MPa.

2. The endless belt of claim 1, wherein the at least one dianhydride is selected from the group consisting of pyromellitic dianhydride and biphenyl tetracarboxylic dianhydride; and the at least one diamine is selected from the group consisting of 4,4-oxydianiline and p-diaminobenzene.

3. The endless belt of claim 1, wherein the polyimide comprises a polyimide repeating unit represented by at least one structure in the parenthesis below:

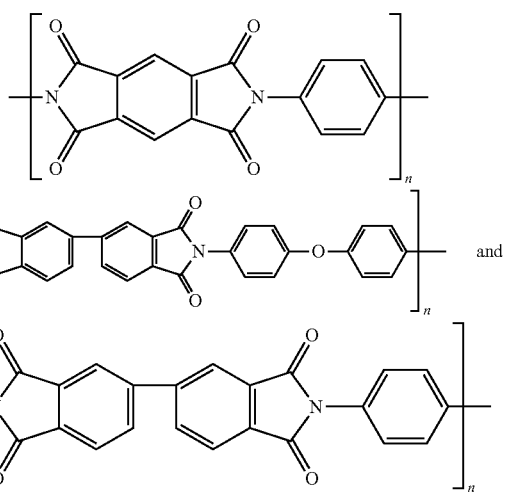

wherein n represents that a variable number of the repeating units can be employed.

4. The endless belt of claim 1, wherein the boron nitride nanotubes have an average diameter of from about 1 nanometer to about 100 nanometers.

5. The endless belt of claim 1, wherein the boron nitride nanotubes have an average length of from about 10 microns to about 500 microns by SEM measurement.

6. The endless belt of claim 1, wherein the boron nitride nanotubes have an aspect ratio ranging from about 100 to about 10,000.

7. The endless belt of claim 1, wherein the substrate layer comprises an amount of boron nitride nanotubes ranging from 1 wt. % to about 20 wt. %, based on the total weight of the substrate layer.

8. The endless belt of claim 1, wherein the substrate layer further comprises at least one filler selected from the group consisting of aluminum nitride, boron nitride, aluminum oxide, graphite, graphene, copper flakes, nano diamond, carbon blacks, carbon nanotubes, metal oxides, doped metal oxide and metal flakes.

9. The endless belt of claim 1, wherein the substrate layer further comprises a polysiloxane polymer.

10. The endless belt of claim 1, further comprising an intermediate layer disposed on the substrate layer, and a release layer disposed on the intermediate layer.

11. An endless belt comprising:
a substrate layer comprising polyimide and a plurality of boron nitride nanotubes dispersed in the polyimide, the polyimide being made from precursors comprising at least one dianhydride and at least one diamine, and the boron nitride nanotubes having a surface area of from about 50 $m^2/g$ to about 500 $m^2/g$ as determined by BET analysis, and being in an amount ranging from about 0.01 wt. % to about 20 wt. %, based on the total weight of the substrate layer, the substrate layer having a Young's modulus of from about 4,000 MPa to about 10,000 MPa;
an intermediate layer disposed on the substrate layer, the intermediate layer comprising a material selected from the group consisting of silicones, fluorosilicones and fluoroelastomers; and
a release layer disposed on the intermediate layer, the release layer comprising a fluoropolymer.

12. The endless belt of claim 11, wherein the boron nitride nanotubes have an average diameter of from about 1 nanometer to about 100 nanometers.

13. The endless belt of claim 11, wherein the boron nitride nanotubes have an average length of from about 10 microns to about 500 microns by SEM measurement.

14. The endless belt of claim 11, wherein the boron nitride nanotubes have an aspect ratio ranging from about 100 to about 10,000.

15. The endless belt of claim 11, wherein the substrate layer comprises an amount of boron nitride nanotubes ranging from 1 wt. % to about 20 wt. %, based on the total weight of the substrate layer.

* * * * *